Jan. 11, 1927.
A. BETZINGER
1,613,922
SKID CHAIN
Filed March 1, 1926
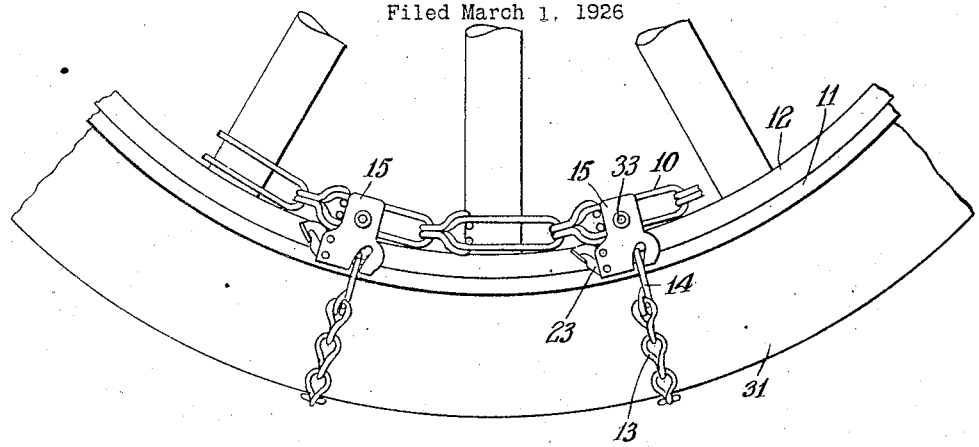
Fig. 1
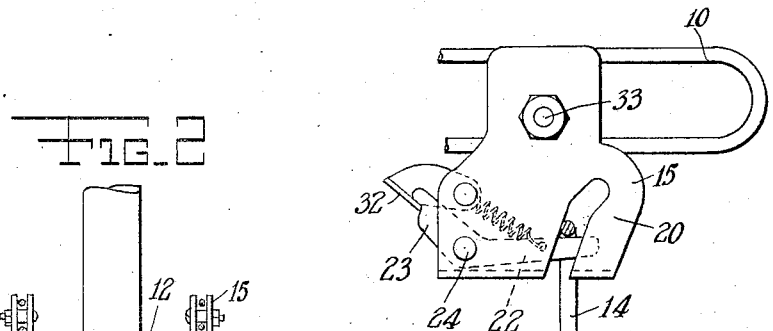
Fig. 3
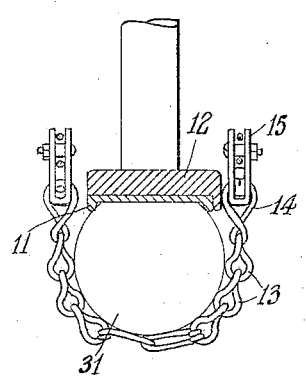
Fig. 2
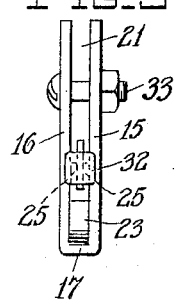
Fig. 5
Fig. 4
INVENTOR
*A. Betzinger*
BY
ATTORNEY Patented Jan. 11, 1927.

1,613,922

UNITED STATES PATENT OFFICE.

AUGUST BETZINGER, OF CHICAGO, ILLINOIS.

SKID CHAIN.

Application filed March 1, 1926. Serial No. 91,434.

The main object of this invention is to provide an improved chain which encircles the tire of an automobile or similar vehicle for the purpose of preventing skidding.

Another object is to provide a non-skid chain having means thereon whereby the cross chain elements may be readily detached or attached as desired. This is accomplished by providing a lock at each end of the cross chain element which securely holds these elements in place.

The above and other objects will become apparent in the description below, in which characters of reference refer to like-named parts in the drawing.

Referring briefly to the drawing, Figure 1 is an enlarged fragmentary elevational view of a portion of a wheel, showing the skid chains attached in the proper position thereon.

Figure 2 is a sectional elevational view thru the automobile wheel, showing the arrangement of the cross chain elements.

Figure 3 is an enlarged elevational view of the lock by means of which the cross chain elements are secured to the non-skid chain and show the latch in closed position.

Figure 4 is a partially broken away elevational view of the latch, showing the same in a releasable position.

Figure 5 is an end elevational view of Figure 3.

Referring in detail to the drawing, the numeral 10 indicates a plurality of elongated links. These links are provided with hook members at one end which loop around the adjacent link and in this series, an endless chain is constructed which is of suitable dimensions to extend entirely around the periphery of a wheel adjacent the felly band 11 and rim 12. The non-skid device consists of two of these chains, one arranged on each side of the rim which are provided with a joined link at some place along their length so that the endless chains may be opened. A plurality of cross chain elements consisting of relatively small links 13 pass around the periphery of the tire from one chain to the other at desired intervals along the length of the chains consisting of links 10. Where these cross chain elements join the links 10, releasable locking means are provided. The locking means are used to retain the larger end link members 14 secure with the links 10. This locking means comprises a casing consisting of a pair of parallel walls 15 and 16 which are joined at their bottom by a floor 17. Near one end of the walls, a channel 18 is formed which opens in the floor 17 of the casing. This channel is formed by providing a slot 19 in each of the walls 15 and 16 near one of the lower corners. The closed end of each slot is provided with a semi-circular enlarged recess 20. The space 21 between the walls 15 and 16 of the casing is large enough to accommodate a bell crank having a relatively long arm 22 and a shorter arm 23. This bell crank is pivoted on a stud 24 and the long arm 22 of said bell crank is adapted to cross and close the open end of the channel 18 when the arm 22 is rotated to a position in which it extends parallel to the floor 17 of the casing, as shown in Figure 3. The shorter arm 23 of the bell crank has its extreme end provided with a slot 25 which is made necessary by a swing of the arm cooperating with a latch lever 26. This lever 26 is mounted pivotally on a pin 27 and is adapted to be rotated out of engagement with the extremity of the smaller arm 23 and into engagement therewith by shouldering upon a reduced extension 28 which forms part of the extreme end of the smaller arm 23 of the bell crank. An opening 29 is provided intermediate the length of the longer arm 22 and is adapted to receive one end of a coil spring 30 which has its opposite end looped about the pin 27 and is normally tensed when the longer arm 22 of the bell crank lies in the position shown in Figure 3.

In practice, it has been found that the cross chain elements consisting of the links 13, which extend around the cross section of the shoe 31, are frequently worn out and broken and in this manner become ineffective. This invention aims to provide means whereby lengths of cross chain elements may be readily replaced when broken or worn out. The means consists of providing a novel type of lock, two locks being used for each cross chain element and are adapted to engage the end links 14 of said cross chain elements. In order to remove one of the end link members 14 from their place in the channels 18 of the lock, the loop of the link member is pulled upwardly in the channel until it registers into the enlarged recess 20. The lever 26 is then pulled upwardly until the pull releases said lever from engagement with the extension 28 on the smaller arm 23 of the bell crank member. Mutual release of these members permits the spring 30 to lift the longer arm 22 of the bell crank upwardly to the position shown in Figure 4, and when the extreme end of the longer arm 22 is passed above the loop of the link 14, which finds itself in the enlarged recess 20, said link 14 drops from place out of the channel 18 and finds itself released. A link such as 14 of a cross chain element is secured in place in the channel 18 of its locking member in the reverse manner, that is, the loop of the link element 14 is inserted into the channel 18 and then into the enlarged recess, the position of the longer arm 22 during this operation being as shown in Figure 4. Holding the link in this position, the shorter arm 23 is rotated upwardly, lifting the lever 26 with this movement and lowering the arm 22 to a position below the link 14 until the thickness of the lever 26 falls into the slot 25 in the shorter arm 23 and a shoulder 32 on said lever 26 engages the extension 28 an the shorter arm 23 and locks the arm 22 in the position shown in Figure 1 with the link 14 retained in place in the channel. The case of these locking elements are secured in place on the chains consisting of the links 10 by slipping said links 10 into the space 21 and passing a bolt 33 thru the walls 15 and 16 of the casing, as illustrated in Figures 1 and 5.

I claim:—

1. In a non-skid chain, means for connecting the cross chains thereof comprising a casing having two sides, a bell crank pivotally mounted in said casing, said sides having channels receptive of the end links of the cross chain elements, recesses at the ends of said channels extending at an angle to said channels, said recesses being adapted to receive the loops of the links, said loops when in said recesses clearing the bell crank, said bell crank when lowered being adapted to lock the links of said chain in the channels, and means for lifting said bell crank for disengaging the end links out of the channels.

2. In a non-skid chain, means for connecting the cross chains thereof comprising a casing having two sides, a bell crank pivotally mounted in said casing, said sides having channels receptive of the end links of the cross chain elements, recesses at the ends of said channels extending at an angle to said channels, said recesses being adapted to receive the loops of the links, said loops when in said recesses clearing the bell crank, said bell crank when lowered being adapted to lock the links in the channel, said bell crank comprising a long arm adapted to span the open end of the channel and close the same, a spring in said casing adapted to lift the long arm upwardly to open said channel, and a lever pivoted above said bell crank engaging the latter to lock said bell crank in lowered position.

In testimony whereof I affix my signature.

AUGUST BETZINGER.